United States Patent [19] Syohji
[11] 3,864,738
[45] Feb. 4, 1975

[54] TAPE RECORDING AND REPRODUCING APPARATUS WITH A MECHANISM FOR CHANGING OVER THE ELECTRICAL CHARACTERISTICS OF THE APPARATUS

[75] Inventor: Keisuke Syohji, Nagoya, Aichi-ken, Japan

[73] Assignee: Shin-Shirasuna Electric Corporation, Aichi-ken, Japan

[22] Filed: May 15, 1973

[21] Appl. No.: 360,575

[30] Foreign Application Priority Data

Aug. 31, 1972 Japan .......................... 47-101973[U]

[52] U.S. Cl. .......................................... 360/69, 360/66

[51] Int. Cl. ............................ G11b 15/02, G11b 5/47

[58] Field of Search .......... 179/100.2 Z; 360/25, 66, 360/69, 60

[56] References Cited

UNITED STATES PATENTS 3,601,558 8/1971 Sugaya .......................... 179/100.2 Z

OTHER PUBLICATIONS

Lafayette Radio Electronics, pg. 105, Catalog 720.

*Primary Examiner*—Stanley M. Urynowicz, Jr.
*Assistant Examiner*—Robert S. Tupper
*Attorney, Agent, or Firm*—Depaoli & O'Brien

[57] ABSTRACT

A cassette tape recorder having a change-over mechanism for automatically changing over the electrical characteristics of the tape recorder so as to match the type of the magnetic material forming the magnetic tape contained within a magnetic tape cassette. The changeover mechanism comprises detector means engageable with the back wall of the cassette to detect the type of the magnetic tape contained therewithin, and actuator means adapted to assume in accordance with the detection by the detector means either a first position in which the actuator means is responsive to depression of a play-back key to actuate a switch or a second position in which it is not responsive to depression of the play-back key. Further, the change-over mechanism has associated therewith a manually operable change-over mechanism which enables said switch in said mechanism to be manually actuated when said mechanism, which should automatically operate, does not operate due to the condition of the cassette back wall.

2 Claims, 5 Drawing Figures

TAPE RECORDING AND REPRODUCING APPARATUS WITH A MECHANISM FOR CHANGING OVER THE ELECTRICAL CHARACTERISTICS OF THE APPARATUS

This invention relates to a cassette tape recorder, and more particularly to such a tape recorder which has a mechanism for changing over the electrical characteristics of the tape recorder in accordance with the type of the magnetic material forming the magnetic tape contained within a cassette.

Capillary iron oxide has heretofore been the most popular material for forming magnetic tapes to be contained within cassettes, but chromium dioxide, superior in characteristics to iron oxide, has also come into use recently. There are now commercially available cassettes containing therewithin magnetic tape formed of capilarry iron oxide as well as cassettes containing therewithin magnetic tape formed of chromium dioxide.

Since these two types of magnetic tape are different in characteristics, it is necessary in use to change over the electrical characteristics of a tape recorder to a condition matching the type of the magnetic tape used. Therefore, in order that the type of the magnetic tape contained within a cassette may be identified, it has heretofore been proposed that means such as a recess be provided in the back wall of the cassette to represent the type of the magnetic tape contained therewithin, e.g., one formed of chromium dioxide, and that such recess be detected to thereby change over the electrical characteristics of the tape recorder so as to match the tape of chromium dioxide.

Such change-over of the electrical characteristics might be achieved by providing detector means which is engageable with the back wall of the cassette when the latter is mounted in the tape recorder and which is responsive to the presence of the recess in the cassette back wall to thereby directly actuate a change-over switch. In this case, however, a relatively great tension would be imparted to the cassette through the detector means so that the cassette would be displaced from its properly mounted position to hamper the proper operation of the tape recorder.

It is therefore a primary object of the present invention to provide a cassette tape recorder having a change-over mechanism which is adapted to change over the electrical characteristics of the tape recorder in accordance with the type of the magnetic material forming the magnetic tape contained within a cassette, and without imparting any undue tension to the cassette when mounted in the tape recorder.

It is another object of the present invention to provide a cassette tape recorder having a change-over mechanism which can perform the described change-over automatically.

It is still another object of the present invention to provide a cassette tape recorder having a change-over mechanism which can perform the described change-over not only automatically but also manually.

According to an aspect of the present invention, a detector means is provided which is engageable with the back wall of a cassette mounted in a tape recorder to mechanically detect whether the magnetic material forming the magnetic tape contained within the cassette is of a first or a second type, and a rotatable actuator means is provided to actuate switch means adapted to change over the electrical characteristics of the tape recorder in accordance with the detected type of the magnetic material. The actuator means is associated with the detector means so that it is brought to a first position when the detection by the detector means indicates that the magnetic material is of the first type and to a second position when the detection indicates that the magnetic material is of the second type. In the first position of the actuator means, when the play-back key of the tape recorder is depressed, the depression force is applied to the actuator means to pivotally move it to thereby actuate the switch means. In the second position of the actuator means, even when the play-back key is depressed, the depression force is not applied to the actuator means and accordingly, the switch means is not actuated. Thus, the electrical characteristics of the tape recorder are automatically changed over so as to match the type of the magnetic material forming the magnetic tape contained within the cassette mounted in the tape recorder.

However, as will be described hereinafter, there may be cases in which the detection by the detector means indicates the second type but actually the magnetic material forming the magnetic tape within the cassette is of the first type. In such cases, the above-described construction cannot change over the electrical characteristics of the tape recorder to a desired condition.

According to another aspect of the present invention, therefore, second actuator means is additionally provided and associated with the switch means so that the latter can be actuated as well by manual operation of the second actuator means.

Other objects, features and advantages of the present invention will become apparent from the following detailed description taken in conjunction with the accompanying drawings.

Figure 1:
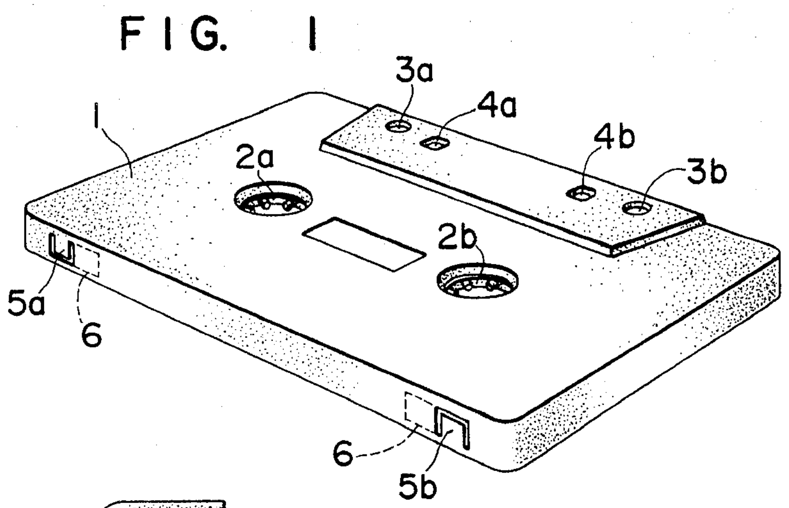
FIG. 1 is a schematic perspective view showing an example of the tape cassette usable with the tape recorder according to the present invention.
Figure 2:
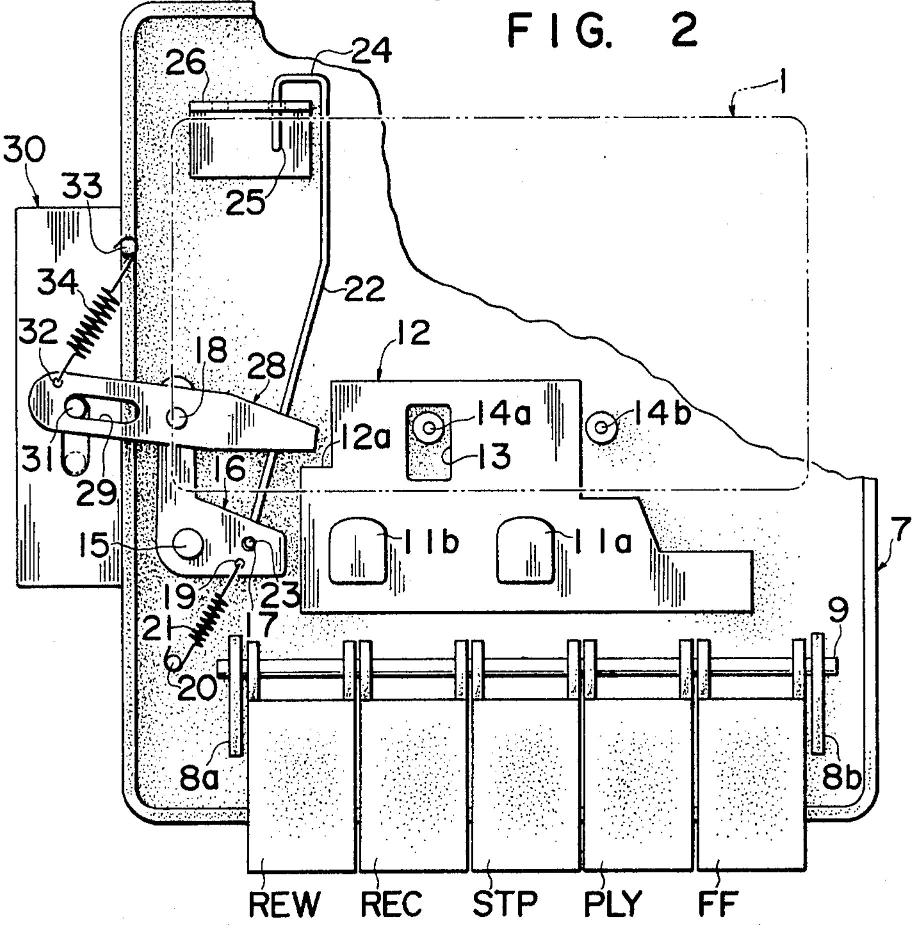
FIG. 2 is a fragmentary, schematic plan view showing the cassette tape recorder according to an embodiment of the present invention.

Referring to FIG. 1, a magnetic tape cassette usable with the present invention is generally designated by numeral 1 and formed with reel openings 2*a* and 2*b* for receiving therein the rotary spindles of a tape recorder when the cassette is mounted in the tape recorder, openings 3*a* and 3*b* each adapted for receiving therein the capstan of the tape recorder, and openings 4*a* and 4*b* for receiving therein the positioning pins extending vertically upwardly from the chassis of the tape recorder (such pins being designated by 14*a* and 14*b* in FIG. 2.). Tongues 5*a* and 5*b* are formed on the back wall of the cassette. These tongues may be removed by breaking them off at their joints if the magnetic tape within the cassette is a prerecorded one and if it is desired to prevent any additional record from being provided thereon inadvertently. All that has been described so far is well known and need not be explained any further.

Here, it is recalled that the magnetic tape contained within the cassette may be either one formed of capillary iron oxide or one formed of chromium dioxide, and the electrical characteristics of the tape recorder must be changed over in accordance with the type of the magnetic tape in use.

For this purpose, recesses are formed in the back wall of the cassette adjacent the respective tongues 5*a* and 5*b*, as indicated by dotted lines in FIG. 1, when the magnetic tape within the cassette is formed of chromium dioxide, for example, but such recesses are absent when the magnetic tape is formed of capillary iron oxide. Thus, the type of the magnetic tape within the cassette can be identified.

Referring to FIG. 2, there is shown an embodiment of the present invention in which a rewind key REW, a record key REC, and a stop key STP, a play-back key PLY and a fast-forward key FF are all pivotally mounted in a row on a common shaft 9 supported by a pair of upright brackets 8*a* and 8*b* provided on the chassis 7. Forwardly of the row of keys, there is provided a slidable subchassis 12 on which a record-reproduce head 11*a* and an erase head 11*b* are mounted in juxtaposed relationship. The subchassis 12 is formed with a slot 13 through which a positioning pin 14*a* projected from the chassis 7 passes and bears against that end of the slot 13 which is remote from the row of keys when the play-back key PLY is not depressed. The subchassis 12 is operatively associated with the play-back key PLY so that it is slidable with depression of this key until the other end of the slot 13, i.e., that end which is adjacent the row of keys, bears against the positioning pin 14*a*. The cassette 1 may be mounted in the position as indicated by the phantom line in FIG. 2.

Figure 3:
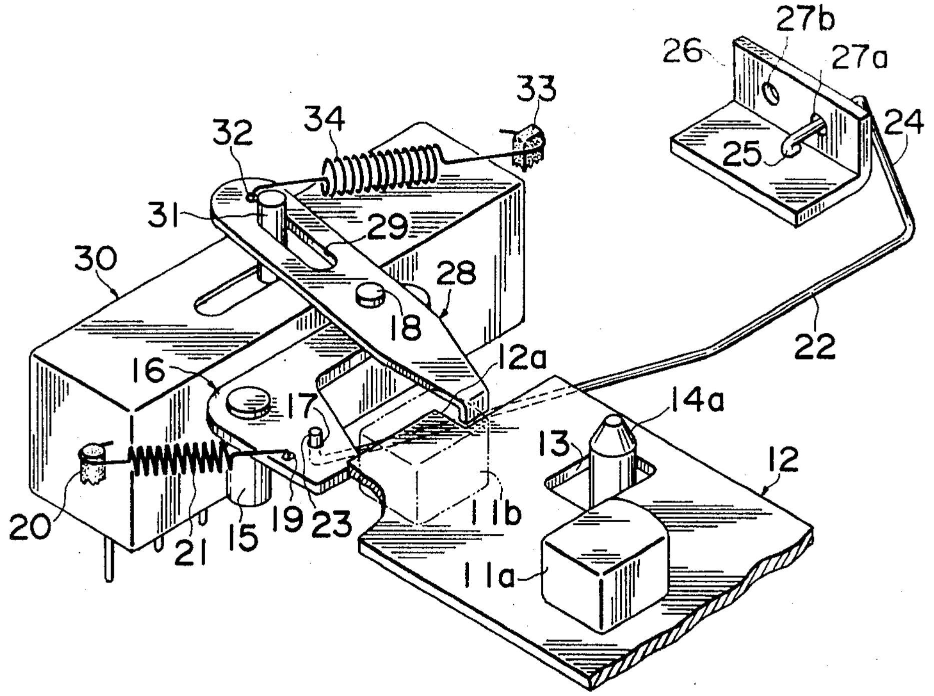
FIG. 3 is a schematic perspective view showing the essential part of the change-over mechanism according to the present invention.

As is shown in FIGS. 2 and 3, an L-shaped shifting member 16 is disposed adjacent the subchassis 12 and pivotally mounted on a shaft 15 extending from the chassis 7. The shifter member 16 has a through-aperture 17 formed in one end portion thereof and an upright pin 18 provided on the other end portion thereof. The shifter member 16 also has another through-aperture 19 formed adjacent the through-aperture 17 to secure one end of a spring 21, the other end of which is secured to a retainer pin 20 provided on the chassis 7. A detector rod 22 extends along the upper surface of the chassis 7 and has a bent end portion 23 engaged in the through-aperture 17 of the shifter member 16. The other end portion of the detector rod 22 is bent obliquely upwardly, as indicated at 24, behind the back wall of the cassette mounted in place, and the farthest end of the bent portion is turned back toward the row of keys, as indicated at 25. Adjacent the back wall of the cassette 1, a support member 26 having an upright portion formed with a pair of through-apertures 27*a* and 27*b* is provided on the chassis 7 with the upright portion being disposed in face-to-face relationship with the back wall of the cassette 1. One of the through-apertures, 27*a*, in the support member 26 loosely receives therein the bent end portion 25 of the detector rod 22.

An actuator member 28 is pivotally mounted on the vertical pin 18 on the shifter member 16 and lies substantially flush with the subchassis 12. One end of the actuator member 28 is downwardly bent and so positioned as to be engaged by a cut-away 12*a* formed in a side of the subchassis 12. The other end portion of the actuator member 28 is formed with a slot 29 in which is engaged an actuator rod 31 of a conventional slide switch 30 mounted on the chassis 7. The actuator member 28 has a hole 32 formed adjacent the slot 29 for securing one end of a spring 34, the other end of which is secured to a retainer projection 33 provided on the chassis 7. The through-aperture 27*b* formed in the support member 26 is meant for an erroneous record preventing mechanism, but such mechanism need not be described herein because it is not directly related to the present invention.

Description will now be made of the operation of the embodiment illustrated in FIGS. 2 and 3. It is assumed that the cassette 1 is of the type which has recesses 6 in the back wall thereof. When such cassette is mounted in place as shown in FIG. 2, the bent end portion 25 of the detector rod 22 is received in one of the recesses 6 so that the shifter member 16 and the actuator member 28 are both held in the position as shown in FIG. 2. In such position, when the play-back key PLY is depressed, the subchassis 12 slides to cause the cut-away 12*a* to strike against one end of the actuator member 28 and thereby rotate the actuator member about the pin 18 in counterclockwise direction, as viewed in FIG. 2, against the force of the spring 34, so that the actuator rod 31 of the switch 30 engaged in the slot 29 in the actuator member is brought to a position as indicated by a dotted line in FIG. 2. Thus, the switch 30 is actuated to automatically change over the electrical characteristics of the tape recorder to a desired condition.

Where the cassette is of the type which has no recess 6 in the back wall thereof, the bent end portion 25 of the detector rod 22 is forced outwardly by the back wall of the cassette as soon as the cassette is mounted in place. As a result, that end of the bias member 16 to which is connected the detector rod 22 is pulled by the detector rod so that the shifter member 16 is rotated about the shaft 15 in counter-clockwise direction, as viewed in FIG. 2, against the force of the spring 21. As the shifter member 16 is so rotated, the actuator member 28 is shifted without displacing the actuator rod 31 of the switch 30, until it is brought to a position in which no engagement can occur between the actuator member 28 and the subchassis 12. In such position, therefore, the switch 30 cannot be actuated even if the subchassis 12 is slid rearwardly by depression of the play-back key PLY.

Figure 4:
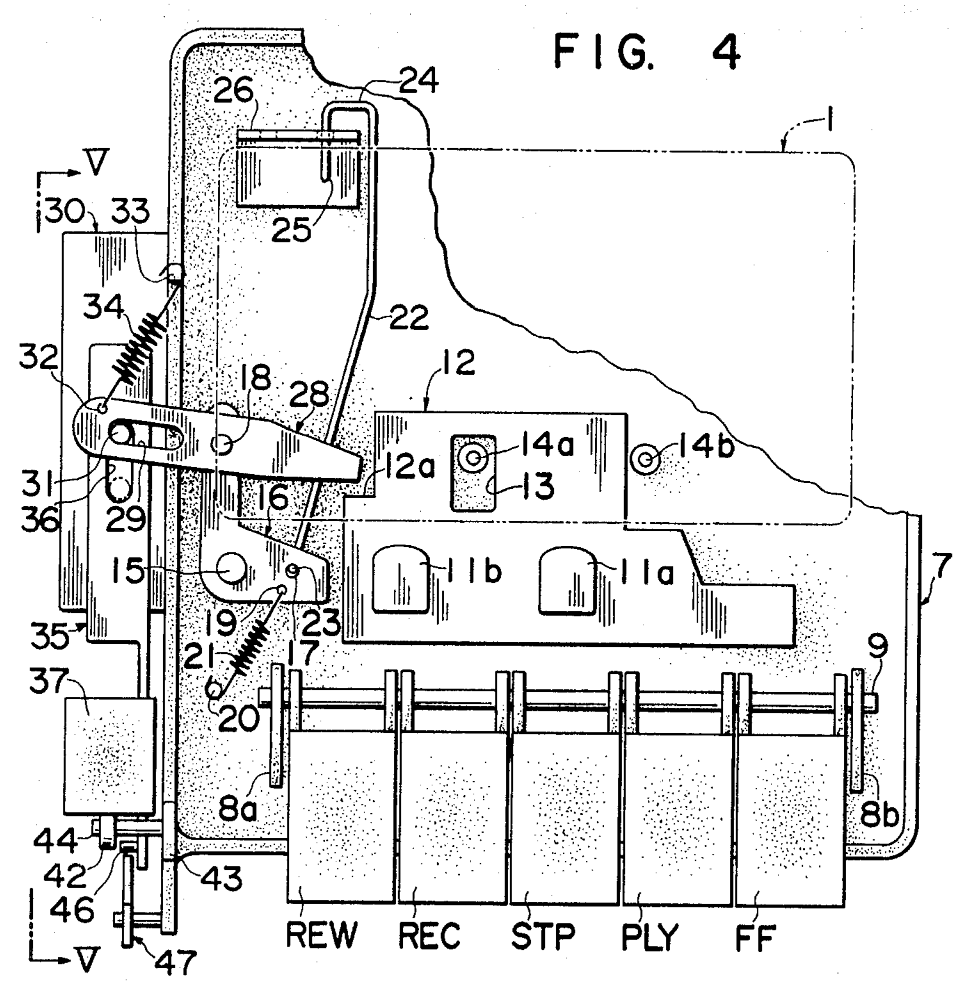
FIG. 4 is a fragmentary, schematic plan view partly showing another embodiment of the present invention.
Figure 5:
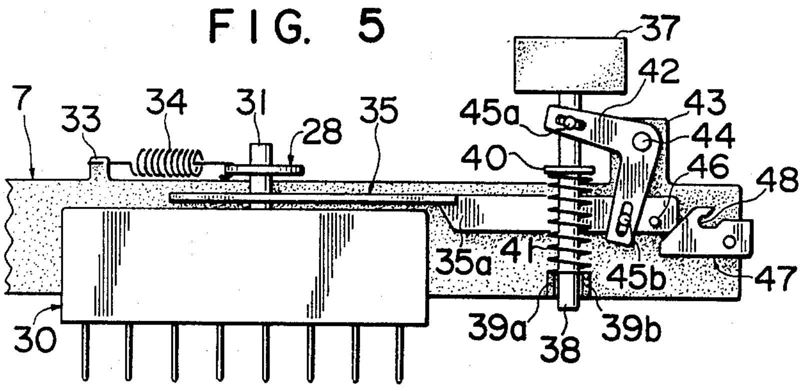
FIG. 5 is a schematic side view taken in the direction of arrows V—V in FIG. 4.

Now, there may be cases in which the identification display on the back wall of a cassette and the type of the magnetic tape within the cassette are not in accord with each other. More specifically, in some cases, a magnetic tape formed of chromium dioxide is contained in a cassette having no recess provided in the back wall thereof. FIGS. 4 and 5 show another embodiment of the present invention which enables the electrical characteristics of the tape recorder to be changed over to a desired condition when such cassette is used. In FIGS. 4 and 5, the parts corresponding to those in FIGS. 2 and 3 are given similar reference numerals.

In the present embodiment, a second actuator member 35 having a slot 36 formed in one end portion thereof is disposed between the switch 30 and the actuator member 28 with the actuator rod 31 of the switch 30 received in the slot 36. The other end portion of the actuator member 35 is formed as a vertical plate-like portion 35*a* substantially parallel to the corresponding side of the chassis 7. A push button 37 having a vertically downwardly extending stem 38 is provided at a location substantially corresponding to the mid-point of the length of the vertical plate-like portion 35*a*. The lower end of the stem 38 of the push button 37 is inserted between a pair of guide members 39*a* and 39*b* provided on the side wall of the chassis 7. The stem 38 of the push button 37 also has a flanged portion 40 formed substantially intermediately thereof, and a coil spring 41 is mounted around the stem 38 between the flanged portion 40 and the guide members 39*a*, 39*b*. Behind the push button 37, an L-shaped connector member 42 is rotatably mounted on an upright bracket 43 by means of a laterally extending shaft 44. The connector member 42 has the opposite ends thereof secured to the stem 38 of the push button 37 and the platelike portion 35*a* of the actuator member 35 by means of pins 45*a* and 45*b*, respectively. Adjacent the free end of the plate-like portion 35*a* of the actuator member 35, there is provided conventional push-push lock means 47 having a cut-away 48 releasably engageable by a laterally extending pin 46 provided on the plate-like portion 35*a*.

With the construction described just above, the electrical characteristics of the tape recorder can be manually changed over so as to match the type of the magnetic tape even if the magnetic tape is formed of chromium dioxide and yet contained within a cassette having no identification recess formed in the back wall thereof. When such a cassette has been mounted in the tape recorder, the actuator member 28 is brought to a position in which it is not rotatable with depression of the play-back key PLY, as described previously, thus permitting no automatic change-over of the electrical characteristics of the tape recorder. In such case, if the push button 37 is depressed, the connector member 42 converts the movement of the depression to a horizontal linear movement which moves the actuator member 35 horizontally, with a result that the actuator rod 31 of the switch 30 is displaced from the full-line position to the dotted-line position of FIG. 4 to thereby actuate the switch 30. At this point of time, the pin 46 provided on the plate-like portion 35*a* of the second actuator member 35 is engaged in the cut-away 48 of the lock mechanism 47, so that the push button 37 is held in its depressed position and accordingly, the actuator rod 31 of the switch 30 is held in the dotted-line position. Thus, the electrical characteristics of the tape recorder have been changed over to a desired condition. When the push button in its depressed position is once again depressed, the lock mechanism 47 is unlocked to permit the actuator member 35 to restore its original position and the actuator rod 31 of the switch 30 to return to its full-line position.

Where a cassette provided with the identification recesses is mounted in the tape recorder, the play-back key PLY is depressed to rotate the actuator member 28, thereby actuating the switch 30 automatically, as described previously. In such case, the actuator member 35 of the above-described manually operable change-over mechanism is engaged with the actuator rod 31 of the switch 30 through the slot 36 and therefore, an automatic change-over operation is never prevented by the manually operable change-over mechanism.

While the present invention has been described with respect to specific embodiments thereof, it should be understood that the invention is not restricted to those embodiments but various modifications may be made therein without departing from the spirit and scope of the invention as defined in the appended claims.

What is claimed is:

1. A cassette-type magnetic tape recording and reproducing apparatus employing a tape cassette containing a pair of reels and a magnetic tape of a predetermined length transported therebetween, said magnetic tape being formed either by a first type of magnetic material having first characteristics or a second type of magnetic material having second characteristics, said tape cassette being provided at the back wall thereof with means indicating the type of the magnetic tape contained therein, a depressable-key board including at least a playback key, magnetic head means, a carrier means having said magnetic head means mounted thereon and being forwardly movable by depressing said playback key so that said magnetic head means is brought into engagement with said magnetic tape, and a mechanism including switch means for changing over the electrical characteristics of said magnetic tape recording and reproducing apparatus so as to match the type of the magnetic material forming said magnetic tape, characterized in that said change-over mechanism comprises detector means contacting said indication means of said tape cassette and assuming a first or position according to the type of the magnetic material forming said magnetic tape contained in said tape cassette, shifter means mechanically coupled to said detector means, and actuator means pivotally mounted on said shifter means for actuating said switch means, said shifter means assuming in accordance with the position of said detector means either a first position where said actuator means is engaged by said carrier means when the latter is forwardly moved in response to the depression of said playback key or a second position where said actuator means is not engaged by said carrier means when the latter is caused to effect said movement, wherein when said detector means assumes said first position and said playback key is depressed, said actuator means is engaged by said carrier means and is pivotally moved to actuate said switch means, thereby changing over the electrical characteristics of said apparatus.

2. A magnetic tape recording and reproducing apparatus according to claim 1, further including an auxiliary change-over mechanism comprising manually operable means for converting a vertical force imparted thereto into a horizontal force, and second actuator means connected between said manually operable means and said switch means for actuating said switch means upon operation of said manually operable means, thereby making it possible to actuate said switch means when said shifter means assumes said second position and the electrical characteristic of said apparatus should be changed over.

* * * * *